3,096,244
SUBSTITUTED BUTYRIC ACID AMIDE AND ANALGESIA

Gustav Ehrhart, Bad Soden, Taunus, Ingeborg Hennig, Kelkheim, Taunus, Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Germany, a corporation of Germany
No Drawing. Filed Dec. 18, 1961, Ser. No. 160,258
Claims priority, application Germany Nov. 6, 1956
5 Claims. (Cl. 167—65)

The present application is a continuation-in-part application of our copending application Ser. No. 693,016, filed Oct. 29, 1957.

The present invention relates to pharmaceutical compositions showing analgesic activity and consisting of butyric acid amides substituted at the nitrogen atom and β-carbon atom of the general formula

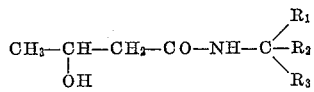

wherein $R_1$ and $R_2$ each represent an alkyl radical containing at most 2 carbon atoms, and $R_3$ is selected from methyl, ethyl and phenyl.

Now we have found that the compounds of the above formula are valuable analgetics which can be obtained in a good yield according to processes generally used for the preparation of carboxylic acid amides.

The reaction of β-hydroxy- or β-acyloxy butyric acids or their functional derivatives with the amines corresponding to the above formula, whereby the desired butyric acid amides can for example be obtained, is carried out according to known methods. As β-acyloxy-butyric acids are concerned for example: β-acetoxy-butyric acid, β-propionyloxy-butyric acid and β-butyryl-oxy-butyric acid. According to the process of the present invention there are used with special advantage the low alkyl or phenyl esters of these acids which are reacted with the corresponding amines. The reaction is effected in the usual manner by prolonged heating of both components, if necessary in the autoclave. As amines may be used for example: tert. butylamine-(1), 1,1-dimethyl-n-propylamine-(1), 1-methyl-1-ethyl-n-propylamine-(1), 1,1-diethyl-n-propylamine-(1), 1,1-dimethyl-n-butylamine-(1), 1-methyl-1-ethyl-n-butylamine-(1), 1,1-diethyl-n-butylamine-(1), 1,1-di-n-propyl-n-butylamine-(1), 1-methyl-1-phenyl-n-propylamine-(1), 1-methly-1-phenyl-n-butylamine-(1), 1-ethyl-1-phenyl-n-butylamine-(1). Naturally, there are also concerned other combinations of alkyl radicals with 1 to 3 carbon atoms, of which one may also be replaced by phenyl, provided there is always used an amine carrying a tertiary alkyl radical.

An advantageous process starting from functional derivatives of the β-hydroxy-butyric acid is carried out by reacting β-hydroxy-butyric acid halides, preferably the corresponding acid chlorides or acid bromides of the β-hydroxy-butyric acids, whose hydroxyl group is suitably substituted by an acyl radical, with the above-mentioned amines. For the prepartion of β-hydroxy-butyric acid amides with a free hydroxyl group, the latter can be protected during the reaction by a radical that is easily split off. Upon termination of the reaction, this protective group is split off in the usual manner, for example by hydrolyzation with dilute alkalies or acids. This reaction is suitably carried out in an inert solvent, for example ether, benzene, toluene, methylene chloride or chloroform, in the presence of an agent splitting off hydrogen halide and, generally, it is already successful in the cold. It is of particular advantage to use as agent splitting off hydrogen halide a second mol of the amine used for the reaction. The hydrogen halide of the amine that has separated can directly be filtered off with suction or be removed by shaking with water.

When preparing the products of the present invention it is of particular advantage to use the reduction of the aceto-acetic acid amides. By amides there are meant such compounds as contain the above mentioned amines as amide components in the acid amide group. The aceto-acetic acid amides can then be reduced in known manner to form the β-hydroxy-butyric acid alkyl amides. The reduction of the keto group can, for example, be effected catalytically with the aid of metals of the 8th group of the periodic system, preferably nickel catalysts, in the presence of customary solvents such as aqueous alcohols, alcohols or water. Noble metals or Raney catalysts may also be used. It is also possible to reduce by means of nascent hydrogen, for example with aluminum amalgam and alcohol, sodium amalgam, lithium aluminum hydride or sodium boron hydride. The reaction may also be carried out electrolytically.

Furthermore, β-hydroxy-butyric acid amides can be prepared according to the invention from the β-amino-butyric acid amides which are obtained according to the usual methods. To these β-amino-butyric acid amides with the desired substituents at the amide nitrogen atom is added dropwise, while stirring, and, if necessary, while cooling, in the presence of a dilute mineral acid, preferably hydrochloric or sulfuric acid, the equimolar quantity of a concentrated aqueous solution of an alkali metal nitrite, preferably sodium nitrite. The evolution of nitrogen indicating the transformation of the amino group into the hydroxy group generally commences when heating to room temperature. The reaction mixture is stirred for some time at room temperature, if necessary at moderately elevated temperatures (for example in the steam bath) until the evolution of gas has ceased and thus the transformation of the amino group into the hydroxy group is complete.

As starting compound there is likewise suitable the β-butyrolactone that can be prepared according to known processes, for example, by catalytic hydrogenation of diketen. By reaction with the said monoalkylamines the said β-hydroxy-butyric acid amides are directly obtained. This reaction takes place by the action of the two components in the presence or absence of solvents, for example water or organic solvents, such as alcohols, benzene, toluene or ethers. Usually, the reaction sets in spontaneously and the reaction products can be isolated from the reaction mixture by fractional distillation or by crystallization.

The products of the present invention are valuable medicaments and have favorable therapeutic properties, while showing a very low toxicity. They show in particular a surprisingly good analgesic efficiency.

The analgesic efficiency was tested according to the Wolff-Hardy and Goodell method by exposing mice to heat until they showed a defensive reflex. At first the normal reaction time was determined. In the control test a group of 60 mice showed the defensive reflex after an average time of 7.2 seconds. When having injected subcutaneously 250 mg./kg. of β-hydroxy-butyric acid-[1-phenyl-1-ethyl-propyl-(1)]-amide the maximum extension of the reaction time was reached 60 minutes after the injection. The following table indicates for the individual products of the present invention the dosage required for producing analgesia. The average extension of the reaction time in the treated 20 mice amounted to 25.3 seconds.

TABLE I

| No. | Compound | Dose required for producing analgesia, mg./kg. |
|---|---|---|
| 1 | β-hydroxy-butyric acid tert. butylamide | [1] 750 |
| 2 | β-Hydroxy-butyric acid-[1-phenyl-1-ethyl-propyl-(1)]-amide | [1] 250 |
| 3 | β-Hydroxy-butyric acid-[1,1-diethyl-propyl-(1)]-amide | [1] 250 |

[1] Subcutaneously.

The low toxicity of the products of the invention is of special importance for their use as medicaments. The following table indicates for example the minimum lethal dose for some products of the invention after intravenous administration.

TABLE II

| No. | Compound | Minimum lethal dose intravenously |
|---|---|---|
| 1 | β-Hydroxy-butyric acid tert. butylamide, g./kg. | 1.5 |
| 2 | β-Hydroxy-butyric acid [1-phenyl-1-ethyl-propyl-(1)]-amide | 150 |
| 3 | β-Hydroxy-butyric acid [1,1-diethyl-propyl-(1)]-amide, mg./kg. | 350 |

For the treatment of pains in humans, the compositions of the present invention may be administered orally as well as parenterally in a dosage from 200 to 500 milligrams. The product can be converted into pharmaceutical preparations, for example, tablets, capsules or injection solutions. When preparing tablets there are added the usual carrier substances such as lactose, starch, talcum, finely dispersed silicio acid and magnesium stearate. The capsules may contain the products suspended in an inert oil such as paraffin oil.

Compared with known analgesics such as β-hydroxy-butyric-acid-p-phenetidide the compositions of this invention proved to be two times more effective. They are superior also with regard to their solubility in water which renders easy the production of injection solutions and consequently the parenteral administration. Besides, after oral application, the compared substance caused production of methaemoglobine in rats which was not stated after intravenous injection of the compositions of this invention.

Moreover the compositions of the invention can be administered in combination with other active ingredients known as adjuvantia in analgesics. For example the following composition of matter may be used:

| | Mg. |
|---|---|
| β-Hydroxy-butyric acid [1,1-diethyl-propyl-(1)]-amide | 400 |
| Caffeine | 20 |
| Magnesium-aluminum silicate | 20 |
| Cornstarch | 142.5 |
| Silicic acid (finely dispersed) | 52.5 |
| Talc | 10 |
| Magnesium stearate | 5 |

The following examples serve to illustrate the invention but they are not intended to limit it thereto.

Example 1

β-HYDROXY-BUTYRIC ACID-TERT. BUTYLAMIDE

Acetoacetic acid tert. butylamide prepared from equivalent quantities of tert. butylamine and diketen in water is dissolved in methanol and hydrogenated at 60–70° C. in the presence of Raney nickel. After filtration and concentration of the filtrate the oily residue is distilled. There is obtained β-hydroxy-butyric acid tert. butylamide boiling at 102° C. under a pressure of 0.45 mm. Hg. The melting point amounts to 88–89° C. (after recrystallization from ethyl acetate).

Example 2

β-HYDROXY-BUTYRIC ACID-[1-PHENYL-1-ETHYL-PROPYL-(1)]-AMIDE 40 grams of 1-phenyl-1-ethyl-propyl-(1)-amine are reacted with the equivalent quantity of diketen as is described in Example 1. There are obtained 40 grams of acetoacetic acid (1-phenyl-1-ethyl)-propyl-(1)-amide melting at 91–92° C. (from ethyl acetate/petroleum ether) which are hydrogenated in methanol at 80° C. in the presence of Raney nickel. After filtration and concentration of the filtrate, the residue being at first oily crystallizes from ethyl acetate/petroleum ether. 35 grams of β-hydroxy-butyric acid-[1-phenyl-1-ethyl-propyl-(1)]-amide melting at 79–80° C. are obtained.

Example 3

β-HYDROXY-BUTYRIC ACID-[1-PHENYL-1-ETHYL-PROPYL-(1)]-AMIDE

To a solution of 50 grams of acetoacetic acid-[1-phenyl-1-ethyl-propyl-(1)]-amide in 150 cc. of methanol are added 50 cc. of water and then in portions 2.5 grams of sodium boron hydride. After the exothermic reaction has subsided, the methanol is distilled off and the solution diluted with water is extracted by means of methylene chloride. After drying and distilling off the solvent the resulting viscous oil (53 grams) is made to crystallize by means of ethyl acetate/petroleum ether. 46 grams of β-hydroxy-butyric acid-[1-phenyl-1-ethyl-propyl-(1)]-amide melting at 79° C. are obtained. The reduction may also be effected in such a way that the starting compound is dissolved in five times the quantity of 2 N-sodium hydroxide solution and sodium boron hydride is then added to this solution. Upon termination of the reaction an oil separates from the aqueous solution; the oil is taken up in methylene chloride and worked up as described above.

Example 4

β-HYDROXY-BUTYRIC ACID-TERT. BUTYLAMIDE

To a solution of 6 grams of β-amino-butyric acid tert. butylamide in 40 cc. of 2 N-hydrochloric acid is added, while cooling with ice and while stirring, a concentrated aqueous solution of 2.8 grams of sodium nitrite. When all of the solution has been added, the ice is removed and the reaction mixture is stirred at first at room temperature and then on the steam bath until the evolution of gas has ceased. The clear solution is concentrated and then extracted with chloroform. Upon drying and evaporation of the solvent the residue being at first oily crystallises. After recrystallisation from ethyl acetate there are obtained 4 grams of β-hydroxy-butyric acid tert. butylamide melting at 88° C.

Example 5

β-HYDROXY-BUTYRIC ACID-TERT. BUTYLAMIDE

To a solution of 9 grams of β-butyrolactone in 30 cc. of ether is added, while cooling, a solution of 8 grams of tert. butylamine in 30 cc. of ether. The mixture is allowed to stand for 24 hours at room temperature. After distilling off the solvent and the unreacted reagents the residue solidifies. There are obtained 10 grams of β-hydroxy-butyric acid tert. butylamide melting at 87° C.

Example 6

β-HYDROXY-BUTYRIC ACID-[1,1-DIETHYL-PROPYL-(1)]-AMIDE 33 grams of acetoacetic acid-[1,1-diethyl-propyl-(1)]-amide melting at 96–97° C., which are obtained from equivalent quantities of 1,1-diethyl-propyl-(1)-amine and diketen in benzene, are dissolved in 100 cc. of methanol and 20 cc. of water. To this solution are added in portions 1.9 grams of sodium boron hydride. After the exothermic reaction has subsided, the methanol is distilled off under reduced pressure. After extracting the residue with ether and washing the ethereal solution with dilute hydrochloric acid, the ether residue crystallises. 28 grams of β-hydroxy-butyric acid-[1,1-diethyl-propyl-(1)]-amide melting at 67–68° C. are obtained (from cyclohexane).

*Example 7*

β-ACETOXY-BUTYRIC ACID-TERT. BUTYLAMIDE 30 grams of β-hydroxy-butyric acid-tert. butyl-amide are boiled for one hour under reflux with 100 cc. of acetic anhydride. After concentration under reduced pressure, the oily residue is taken up in ether and washed with sodium carbonate solution until a neutral reaction is obtained. After drying and distilling off the ether, the residue solidifies. On recrystallisation from cyclohexane there are obtained 23 grams of β-acetoxy-butyric acid-tert. butylamide melting at 66–67° C.

*Example 8*

β-HYDROXY-BUTYRIC ACID TERT. BUTYLAMIDE

To a solution of 20 grams of β-acetoxy-butyric acid chloride boiling at 85–90° C. under a pressure of 18 mm. of mercury (prepared from β-acetoxy-butyric acid and thionyl chloride) in 60 cc. of ether is slowly added dropwise, while stirring and cooling, a solution of 22 grams of tert. butylamine in 60 cc. of ether. After the precipitated tert. butylamine hydrochloride has been filtered off with suction, the filtrate is washed once with water. After drying and distilling off the ether, the residue crystallises. After recrystallisation from cyclohexane there are obtained 23 grams of β-acetoxy-butyric acid-tert. butylamide melting at 66–67° C.

5 grams of this compound are heated for one hour with 35 cc. of 2 N-hydrochloric acid on the steam bath. After addition of solid potassium carbonate until saturation is achieved, the oil that has formed is taken up in ether. After drying and distilling off the ether, the residue crystallises. After recrystallisation from ethyl acetate the β-hydroxy-butyric acid-tert. butylamide melts at 88–89° C.

We claim:

1. A pharmaceutical composition having analgesic activity consisting essentially of a substituted butyric acid amide of the general formula

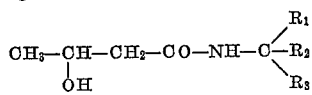

wherein $R_1$ and $R_2$ each represent an alkyl radical containing at most 2 carbon atoms, and $R_3$ is selected from methyl, ethyl and phenyl, and a pharmaceutically acceptable carrier.

2. A pharmaceutical composition in dosage unit form having analgesic activity containing from 200 to 500 milligrams of a substituted butyric acid amide of the general formula

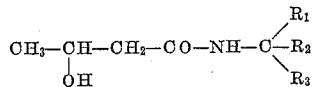

wherein $R_1$ and $R_2$ each represent an alkyl radical containing at most 2 carbon atoms, and $R_3$ is selected from methyl, ethyl and phenyl, and a pharmaceutically acceptable carrier.

3. A pharmaceutical composition having analgesic activity consisting essentially of β-hydroxy-butyric acid-tert. butylamide and a pharmaceutically acceptable carrier.

4. A pharmaceutical composition having analgesic activity consisting essentially of β-hydroxy-butyric acid [1,1-diethyl-propyl-(1)]-amide and a pharmaceutically acceptable carrier.

5. A method of producing analgesia which comprises administering a substituted butyric acid amide of the general formula

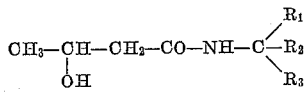

wherein $R_1$ and $R_2$ each represent an alkyl radical containing at most 2 carbon atoms, and $R_3$ is selected from methyl, ethyl and phenyl.

References Cited in the file of this patent

UNITED STATES PATENTS

| | | |
|---|---|---|
| 2,545,044 | Reynolds | Mar. 13, 1951 |
| 2,571,755 | Pfister | Oct. 16, 1951 |
| 2,601,387 | Gresham | June 24, 1952 |
| 2,702,822 | Weisgerber | Feb. 22, 1955 |
| 2,742,397 | Ott | Apr. 17, 1956 |
| 2,749,355 | Jones | June 5, 1956 |
| 2,855,342 | Wagner | Oct. 7, 1958 |

FOREIGN PATENTS

| | | |
|---|---|---|
| 457,379 | Canada | June 14, 1949 |
| 943,459 | France | Oct. 4, 1951 |
| 534,052 | Canada | Dec. 4, 1956 |